(12) United States Patent
Amann et al.

(10) Patent No.: US 10,386,218 B2
(45) Date of Patent: Aug. 20, 2019

(54) TEMPERATURE MEASUREMENT SYSTEM FOR MEASURING THE TEMPERATURE OF A TUBE AND FLOWMETER COMPRISING THE TEMPERATURE MEASUREMENT SYSTEM

(71) Applicant: ROTA YOKOGAWA GMBH & CO. KG, Wehr (DE)

(72) Inventors: Matthias Amann, Grafenhausen (DE); Thomas Boelke, Freiburg (DE); Jacek Kowol, Gundelfingen (DE); Peter Reinshaus, Kuessaberg (DE)

(73) Assignee: ROTA YOKOGAWA GMBH & CO. KG, Wehr (DE)

( * ) Notice: Subject to any disclaimer, the term of this patent is extended or adjusted under 35 U.S.C. 154(b) by 197 days.

(21) Appl. No.: 15/358,190

(22) Filed: Nov. 22, 2016

(65) Prior Publication Data
US 2018/0143050 A1    May 24, 2018

(51) Int. Cl.
*G01F 1/684* (2006.01)
*G01F 1/84* (2006.01)
*G01K 1/00* (2006.01)

(52) U.S. Cl.
CPC .............. *G01F 1/8409* (2013.01); *G01K 1/00* (2013.01); *G01F 1/8477* (2013.01)

(58) Field of Classification Search
CPC .. G01K 7/16; G01K 2007/163; G01F 1/6847; G01F 1/06
See application file for complete search history.

(56) References Cited

U.S. PATENT DOCUMENTS

| | | | | |
|---|---|---|---|---|
| 3,022,478 A * | 2/1962 | Fish | ........................ | G01K 1/143 338/25 |
| 4,971,452 A * | 11/1990 | Finney | .................... | G01K 1/143 338/28 |
| 5,993,061 A * | 11/1999 | Drouet | ................... | G01K 1/143 374/147 |
| 6,546,823 B1 * | 4/2003 | Veit | ........................ | G01D 11/30 73/866.5 |
| 6,782,743 B2 * | 8/2004 | Koike | ...................... | G01F 1/684 73/202.5 |
| 7,026,909 B2 * | 4/2006 | Glozman | .................. | G01K 1/12 338/229 |
| 7,824,101 B2 * | 11/2010 | Kloiber | ................ | G01D 11/245 374/147 |
| 8,044,327 B2 * | 10/2011 | Azpiritxaga | .......... | F24C 15/105 219/448.11 |
| 8,870,455 B2 * | 10/2014 | Daily | ..................... | G01K 1/026 374/179 |

(Continued)

*Primary Examiner* — Freddie Kirkland, III
(74) *Attorney, Agent, or Firm* — Grossman, Tucker, Perreault & Pfleger, PLLC

(57) ABSTRACT

The invention relates to a temperature measurement system for measuring a temperature of a tube, comprising a temperature sensor contained in a housing having a contact surface which is connected to an outer surface of the tube, wherein the contact surface has a concave form matching a form of the outer surface of the tube, and wherein a temperature-conductive, flexible intermediate layer is arranged between the contact surface and the outer surface of the tube. A further object is a flowmeter, particularly a Coriolis mass flowmeter, comprising the temperature measurement system.

15 Claims, 2 Drawing Sheets

(56) References Cited

U.S. PATENT DOCUMENTS

| | | | | |
|---|---|---|---|---|
| 9,040,338 | B2* | 5/2015 | Eisele | G01K 7/16 |
| | | | | 257/426 |
| 9,448,124 | B2* | 9/2016 | Hays | G01F 1/84 |
| 9,921,088 | B2* | 3/2018 | Wang | G01K 7/16 |
| 2005/0129089 | A1* | 6/2005 | Glozman | G01K 1/12 |
| | | | | 374/185 |
| 2008/0077201 | A1* | 3/2008 | Levinson | A61B 5/411 |
| | | | | 607/96 |
| 2013/0228890 | A1* | 9/2013 | Eisele | G01K 7/16 |
| | | | | 257/467 |
| 2015/0041451 | A1* | 2/2015 | Kriwan | G01P 13/006 |
| | | | | 219/201 |
| 2016/0138952 | A1* | 5/2016 | Wang | G01K 7/16 |
| | | | | 73/204.25 |

* cited by examiner

TEMPERATURE MEASUREMENT SYSTEM FOR MEASURING THE TEMPERATURE OF A TUBE AND FLOWMETER COMPRISING THE TEMPERATURE MEASUREMENT SYSTEM

FIELD OF THE INVENTION

The present invention relates to a temperature measurement system for measuring the temperature of a tube. In another aspect, the present invention relates to a flowmeter, especially a Coriolis mass flowmeter, utilizing this temperature measurement system.

BACKGROUND

The temperature of a tube is often indicative of the temperature of a fluid flowing through the tube, especially in case the tube is made of a temperature-conductive material. Temperature measurement of a tube is therefore often used for determining the temperature of the fluid inside the tube as this is normally easier than measuring the temperature of the fluid itself. Accordingly, a reliable temperature measurement system is needed for measuring the temperature of a tube.

Flowmeters are used to determine the mass flow rate of a fluid flowing through a tube. Coriolis mass flowmeters use the vibration pattern of two measuring tubes arranged in parallel for this purpose. The stiffness of these measuring tubes is dependent on the coefficient of elasticity of the tube material and the thermal expansion of the measuring tubes. Accordingly, the vibration pattern also, to some extent, changes with temperature. Coriolis mass flowmeters therefore take temperature measurements of the measuring tubes in order to compensate the temperature dependency and to obtain correct measurement results. Without temperature correction, measurement errors of about 5% would occur for a temperature change of 100° C. The deviation is the higher the more the measurement temperature differs from the temperature at which the flowmeter was calibrated. As calibration is normally carried out at room temperature this means that the deviation increases with increasing temperatures of the measuring tubes. At high and low (cryogenic) temperatures, reliable compensation—and thus correct mass flow rate measurement-primarily depends on a correct temperature measurement of the measuring tubes.

The measuring tubes utilized in flowmeters are usually rather small so that penetrating them with a temperature probe to measure the internal temperature is generally impractical. Some devices are known where the temperature probe is inserted into the flow splitter of the flowmeter. While this arrangement is very complicated and expensive the temperature measurement is still prone to errors. On the other hand, measuring the temperature at the outer surface of the measuring tube is easier to handle but often leads to unreliable and/or incorrect results. This is what can widely be experienced with prior art Coriolis mass flowmeters using a temperature probe which is directly attached to the tube surface. The temperature probe used is usually a resistance temperature detector (RTD) which is glued, soldered or brazed to the outer surface of the measuring tube. The heat dissipation of the RTD outer surface, which is normally not in a very good thermal contact with the tube, greatly influences the measured temperature. Measurement errors in the range of from twice to 5-fold as high as the specified accuracy can be seen at, for example, 125° C. as compared to 25° C. ambient temperature.

It is therefore an object of the present invention to eliminate the above-mentioned problems and, more precisely, to devise a temperature measurement system for measuring a temperature of a tube which can easily be installed at the outer surface of the tube and without the need to insert a temperature probe into the tube interior while leading to reliable and reproducible temperature measurement results. A further object is to devise a flowmeter, particularly a Coriolis mass flowmeter, utilizing a temperature measurement system for measuring a temperature of a measuring tube which allows for an improved temperature compensation of the mass flow rate measurements.

SUMMARY

In a first aspect, therefore, the invention relates to a temperature measurement system for measuring a temperature of a tube, comprising a temperature sensor contained in a housing having a contact surface which is connectable to an outer surface of the tube. According to the invention, the contact surface of the housing has a concave form matching the form of the outer surface of the tube to which the housing is to be attached. Between the concave contact surface of the housing and the outer surface of the tube, a temperature-conductive, flexible intermediate layer is arranged. Adapting the form of the contact surface of the housing of the temperature sensor to the form of the outer surface of the tube enlarges the contact area between both parts. The thermal contact is further improved by means of the temperature-conductive, flexible intermediate layer which compensates any irregularities of the contact surfaces and fills any gaps between both parts so that a complete and intimate contact and excellent thermal conductivity are guaranteed. As a result of the excellent thermal conductivity between the tube outer surface and the housing of the temperature sensor greatly improved and much more reliable temperature measuring of the tube temperature becomes possible.

The temperature sensor utilized in the temperature measurement system of the invention preferably is a resistance temperature detector (RTD), such as a PT100, PT500 or PT1000. However, principally, any other type of contact temperature sensor may be used as well. The housing of the temperature sensor is at least partly made of a material which can conduct heat. While at least the contact surface of the housing must be thermally conductive, it is preferred that the housing as a whole is made of a thermally conductive material. It is especially preferred that the housing is in the form of a massive block containing at least one hollow space for the temperature probe (the temperature-sensitive element), electric wires and so on. A preferred material for the housing is a metallic material, particularly aluminum.

The surface of the housing coming into contact with the tube whose temperature is to be measured is called contact surface and is specifically formed to match the form of the outer surface of the tube. For normal tubes having a circular cross-section the form of the contact surface of the housing will thus form a barrel-vault having a cross-section corresponding to a segment of a circle. The radius of the contact surface and that of the tube are ideally identical. It has to be noted, however, that the form of the contact surface of the housing can be adapted to any other kind of tube form, such as tubes having an oval cross-section. Due to the complementary forms of contact surface of the housing and the tube both parts are in contact with each other over the largest possible contact area. Accordingly, heat transfer from the tube to the temperature sensor is easily possible leading to improved measurement results.

The heat transfer from the tube to the temperature sensor is further improved by the use of an intermediate layer between the contact surface of the housing and the outer surface of the tube. As mentioned above, a heat-conductive material which is also flexible is used for the intermediate layer. This material can fill the gap between both parts even if the width of the gap changes as a result of deformations caused by temperature changes. Examples for materials that can be used for the intermediate layer are temperature-conductive plastics and soft metals. The group of plastics materials can also comprise adhesives which may additionally serve to fix the housing of the temperature sensor to the outer surface of the tube. It is especially preferred to use a graphite layer as the intermediate layer. The layer thickness is expediently chosen to be as small as possible in order to ensure short ways of the heat transfer from the tube to the temperature sensor but large enough to ensure an intimate contact of both parts over the whole contact area under all working conditions.

As could be shown by the inventors of the present invention, one of the reasons why contact temperature sensors of the prior art did not provide reliable tube temperature measurements, especially at high temperatures, resides in the heat dissipation from the outer surface of the temperature sensor. The heat loss from the housing of the temperature sensor to the surroundings to some degree reduces the temperature in the temperature sensor and thus falsifies the measuring results. The inventors have therefore taken additional measures to reduce the heat dissipation from the outer surface of the temperature sensor and thus further improved the reliability of the temperature measurement system of the invention. In more detail, the housing of the temperature sensor is surrounded on at least one of its sides by a temperature-conductive cover which is connected in a temperature-conductive manner to the outer surface of the tube. The cover being connected to the tube and being formed of a heat-conductive material adopts the same temperature as the tube. The heat is at least to some extent radiated in the direction of the adjacent part of the housing of the temperature sensor and reduces or prevents the heat loss from this part of the housing. The cover also shields the housing against air currents and reduces the influence of heat dissipation by convection. Preferably, the cover has at least the same height and width as the adjacent side of the housing.

In a preferred embodiment of the invention, the cover surrounds the housing on more than one side and most preferably has the form of a bridge straddling two opposing sides of the housing and its top. It is preferred that the cover is arranged with a small distance to the surface of the housing. This allows both the housing and the cover to expand and contract freely under temperature changes. It would, however, also be possible to fill the gap between the cover and the housing at least partly with an elastic material, such as heat-conductive plastics. In case the housing has essentially the form of a cuboid a bridge straddling the housing as a cover preferably has the form of a "U" with the free legs arranged at opposing sides of the housing and the central part covering the top. As in case of the contact surface of the housing, the face sides of the cover can be shaped such as to follow the outer contour of the tube to which they are being fixed. For a circular tube the face sides will thus have a rounded, concave form with a radius corresponding to the radius of the tube. The cover can be fixed to the tube in any suitable way, provided that heat is allowed to be transferred from the tube to the cover. A heat-conductive adhesive may be used for this purpose. As it is preferred for the cover to be made from metal, especially steel or aluminum, it is, however, preferred to fix the cover by brazing, soldering or welding.

The housing can principally be fixed to the tube in the same way as the cover, that is, in any suitable way allowing sufficient heat transfer from the tube to the housing. The examples mentioned in connection with the cover may also be applied for attaching the housing to the tube. In an especially preferred embodiment of the invention, however, the housing is simply pressed against the surface of the tube and no further attachment means is used. Accordingly, a pushing means is additionally provided which is adapted to apply a force onto the housing in order to generate sufficient contact pressure with which the housing is pressed against the tube surface. The pressure is expediently applied to the top of the housing. It is consequently especially preferred for the pushing means to be arranged on a central part of a bridge-type cover adjacent to the top of the housing. The pushing means may be any suitable means which can exert a pressure on the housing, such as, for example, a spring, a stamp, a screw or the like. It is particularly preferred for the pressure to be adjustable since then the pressure can be adjusted such as to keep the contact pressure between the housing and the outer surface of the tube essentially constant even if the working conditions, particularly the temperature, change. In a most preferred embodiment, the pushing means is a screw which is turnably arranged in a threaded opening in a central portion of the bridge.

The suitable contact pressure with which the housing is to be pressed against the tube surface can be calculated in a per se known manner using the finite elements method (FEM). The main parameters influencing the contact pressure are the pressure of the pushing means (the torque of the screw in case of a screw being used as the pushing means) and the stiffness of the central part of the bridge used as a cover. Both parameters are preferably adjusted in accordance with the results of the FEM calculation such that the contact pressure is kept essentially constant. In the context of the present invention, this means that the contact pressure does not change by more than 30%, preferably no more than 20%, and most preferably less then 10%, in the expected operating temperature range in which the temperature measurement system is to be employed as compared to the situation at 20° C.

The temperature measurement system of the invention can be used in any application where the temperature of the tube is to be determined. These may be applications where the temperature of the tube is determined in order to draw conclusions on the temperature of the fluid flowing through the tube. A preferred use of the temperature measurement system is with flowmeters. Here, the temperature of the tube is needed in order to compensate measurement errors occurring at measurement temperatures which are lower or higher than the temperature at which the flowmeter was calibrated, as described in the introducing part of the present application. The flowmeter with which the temperature measurement system of the invention is used can be any flowmeter of the prior art. The system is especially suited for use with Coriolis mass flowmeters. The temperature measurement system of the invention can especially easily be applied to a measurement tube of the flowmeter and principally in the same way as prior art measurement systems. There is no need for inserting a temperature probe into the interior of the tube. Although the temperature measurement system is attached to the outside of the tube, superior temperature measurement results can be obtained as compared to prior art measurement systems of the contact as well as of the insertion type. Hence, reliable mass flow rate measurements are obtained even at temperatures far away from the temperature at which the flowmeter was calibrated.

In a second aspect, the invention also relates to a flowmeter, especially a Coriolis mass flowmeter, utilizing the temperature measurement system as described herein. The temperature measurement system used in the flowmeter of the invention can have any suitable combination of features which have been described in the present description, the attached claims and drawings as well as the following drawing description. The invention also comprises any obvious modifications which easily occur to the person skilled in the art.

BRIEF DESCRIPTION OF THE DRAWINGS

The invention shall be described in more detail with reference to the accompanying drawings. The drawings, which are merely schematic, are only illustrative of a preferred embodiment but not intended to restrict the invention to this specific example. In the drawings.

DETAILED DESCRIPTION

Figure 1:
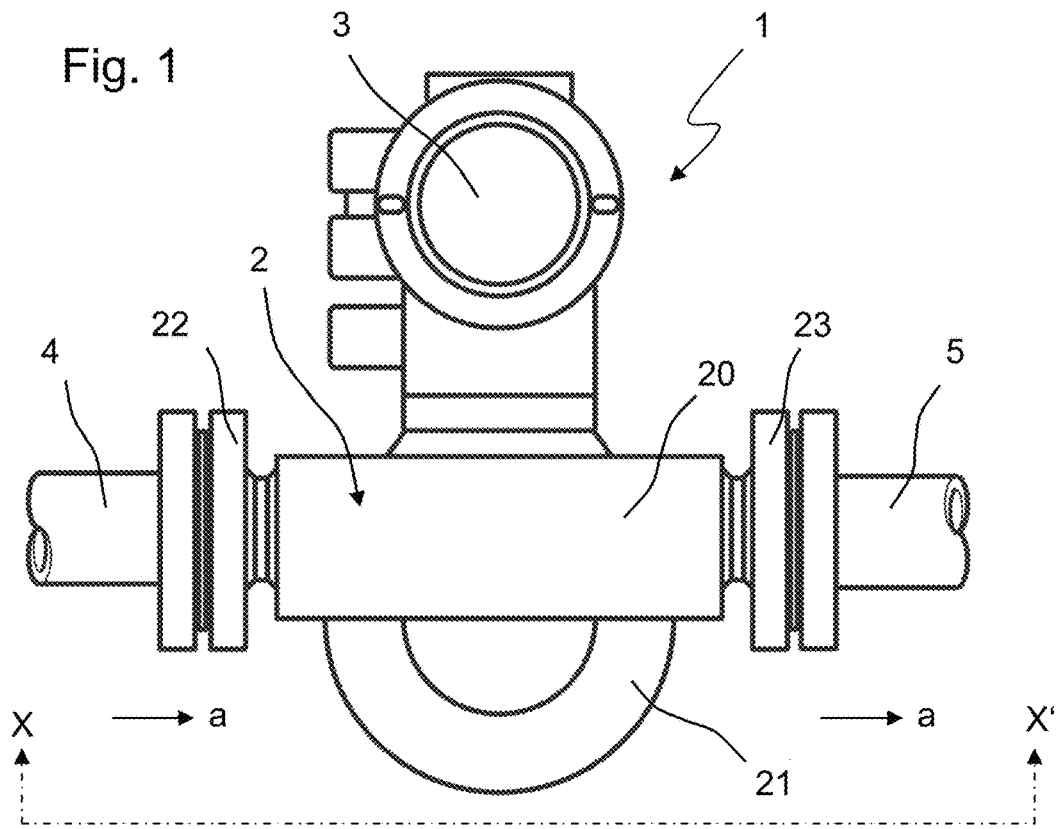
FIG. 1 shows a perspective view of a Coriolis mass flowmeter in accordance with the invention.

FIG. 1 shows an exemplary embodiment of a Coriolis mass flowmeter in accordance with the present invention. The Coriolis mass flowmeter 1 is comprised of a measurement casing 2 to which a tube casing 21 is connected. The Coriolis mass flowmeter 1—in the following also denoted as a flowmeter only—additionally comprises a transmitter casing 3 containing measurement electronics, display means and the like. The flowmeter 1, in a per se known manner, is arranged in a tube system between an inlet pipe 4 and an outlet pipe 5 to which it is connected via an inlet flange connection 22 and an outlet flange connection 23, respectively. The fluid, such as a gas or a liquid, which is guided through the pipes 4 and 5 enters the Coriolis mass flowmeter 1 on the left side in FIG. 1 and exits on the right side as indicated by the arrows a.

Figure 2:
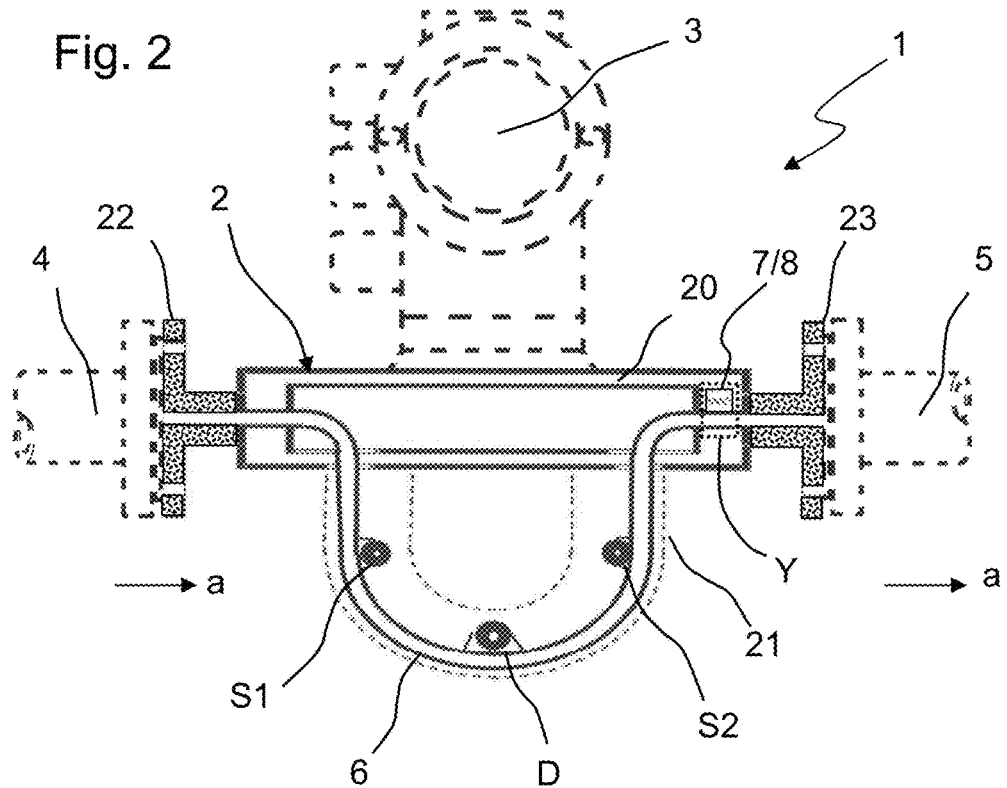
FIG. 2 shows a cross-sectional view on plane X-X' in FIG. 1.

As can be taken from FIG. 2, the fluid, after having entered the flowmeter at inlet flange connection 22, is guided through a U-shaped measurement tube 6 which is arranged inside the tube casing 21. The flowmeter of this embodiment is of a double-tube type. That is, a second U-shaped measurement tube corresponding to the measurement tube 6 is arranged in parallel behind measurement tube 6 but concealed in the view shown in FIG. 2. The mass flow rate of the fluid passing through the flowmeter 1 is determined by measuring the vibration pattern of the measurement tubes, as principally known in the art. For this purpose, a driver unit D and two sensors S1 and S2 are connected to the measurement tube 6.

Figure 3:
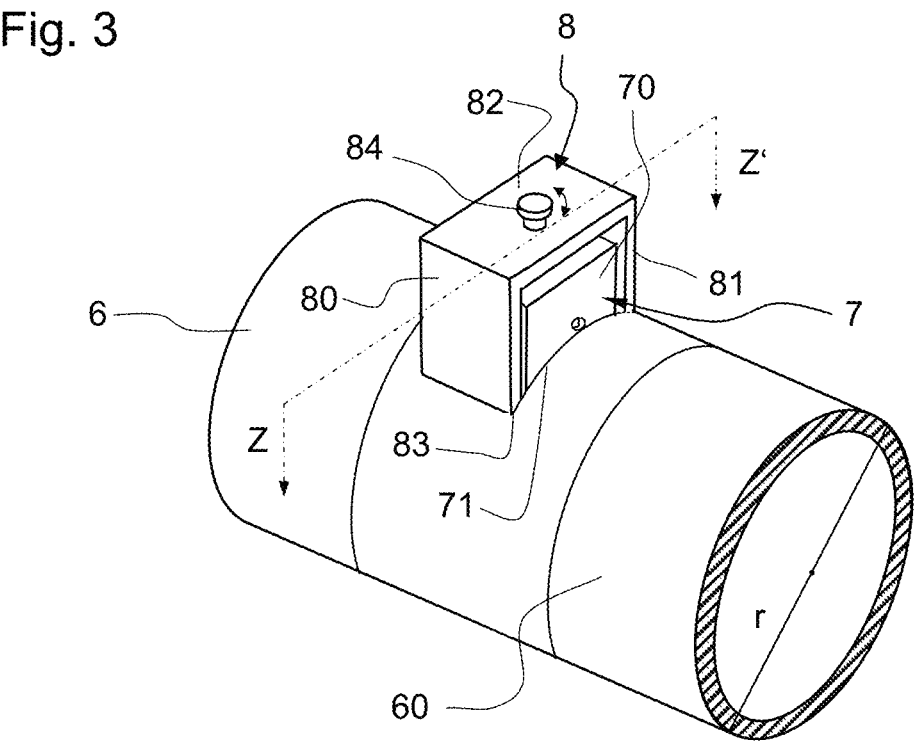
FIG. 3 shows a partial perspective view of a measuring tube equipped with a temperature measurement system of the invention in the region Y in FIG. 2.

The measurement results are temperature-dependent, as explained before. Accordingly, a temperature sensor 7 is arranged—in the present case near the outlet flange connection 23 (at the inlet flange or both flange connections would also be possible)—in order to measure the temperature of the measurement tube 6 and to correct the measured mass flow rate values dependent on the determined tube temperature. This is principally also already known from the prior art. The present invention, however, utilizes an improved temperature measurement system for measuring the temperature of the tube. The temperature measurement system of the invention is shown in more detail in FIG. 3, which is an enlarged partial perspective view of the measurement tube 6 in the region Y in FIG. 2. The temperature measurement system 7 is attached to the outer surface 60 of the measurement tube 6. It comprises a housing 70 which is essentially formed as a cuboid. The contact surface 71 adjacent to the tube surface 60, however, is curved so as to match the outer contour of the tube 6. The radius r of the tube 6 is identical to the radius of the curvature of the concave contact surface 71 of the housing 70. The area under the contact surface 71 principally has the form of a barrel-vault. Due to the complementary concave contact surface the housing 70 of the temperature sensor 7 is in intimate contact with the outer surface of the tube 6. This allows for a greatly improved heat transfer from the tube 6 to the temperature sensor 7 and leads to improved temperature measurement results.

Figure 4:
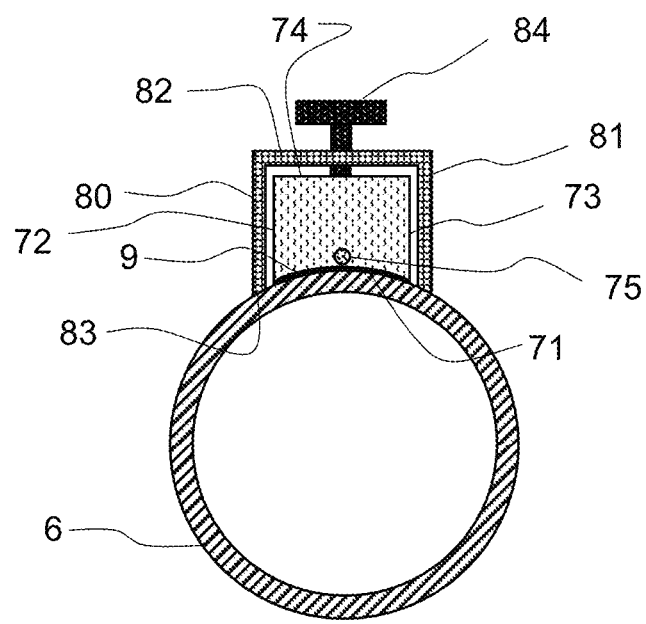
FIG. 4 is a cross-sectional view on plane Z-Z' in FIG. 3.

The heat transfer is even more improved by forming an intermediate layer 9 between the contact surface 71 and the outer surface 60 of the tube 6. The intermediate layer 9 covers the whole contact surface 71, as indicated in the cross-sectional view shown in FIG. 4. In this example, the intermediate layer 9 consists of graphite which is a good heat conductor and easily adapts to the opposing contact surfaces. The intermediate layer 9 can thus compensate surface irregularities and leads to an even more intimate contact between the contact surfaces.

The housing 70 of the temperature sensor 7 is also made of a material with good heat-conductive properties. A metal, such as aluminum, is preferred for this purpose. In the present embodiment, the housing 70 is formed as an aluminum block which has a rod-shaped opening 75 extending at a short distance above the contact surface 71 in a direction essentially corresponding to the lengthwise direction of the tube 6. A temperature probe/temperature-sensitive element is inserted into the opening 75 and connected by electric wiring (not shown) to an evaluation unit. Preferably, resistance temperature measurement is used for determining the temperature of the measurement tube 6. Accordingly, the temperature measurement system preferably comprises a resistance temperature detector (RTD), such as a PT100, PT500 or PT1000. Exact temperature measurement becomes possible since the temperature probe is in excellent thermal contact with the surface 60 of the measurement tube 6.

The measurement results are still further improved by measures which prevent heat loss from the outer surfaces of the housing 70 of the temperature sensor 7. For this purpose, a cover 8 is provided having the form of a bridge with an essentially U-shaped cross-section. The cover 8 has two opposing legs 80 and 81 which are arranged adjacent to the lateral faces 72 and 73 of the housing 70. The legs are connected by top plate 82 which runs parallel to the top 74 of the housing 70. The housing 70 is thus covered on two sides and on top by bridge-shaped cover 8. The cover 8 is made of a heat-conductive material, preferably a metal, such as steel. It is connected at its both faces 83 in such a way that heat from the measurement tube 6 can be transferred to the cover and the cover essentially adopts the same temperature as the tube 6. In order to ensure a good heat transfer, the faces 83 are rounded such as to match the curvature of the outer surface of the measurement tube. As in case of the contact surface 71, the radius of the curvature of the faces 83 corresponds to the radius of the measurement tube 6. The cover 8 can be fixed to the tube 6 in any suitable way but it is preferred for the cover to be attached by soldering, brazing or welding. Since the cover has essentially the same temperature as the measuring tube heat can be radiated from the cover in the direction of the housing 70. As a result, heat dissipation from the housing to the surroundings can be greatly reduced or even prevented and the housing essentially adopts the same temperature as the tube 6 even in regions away from the contact surface 71. This is especially important at high measurement temperatures which differ greatly from the ambient temperature. While considerable measurement errors were experienced with prior art devices under these circumstances only very small deviations, if any, occur with the temperature measurement system in accordance with the present invention.

In the described embodiment, the temperature sensor 7 is attached to the measurement tube 6 by means of pressure only. For this purpose, a pushing means 84 is used which exerts a pressure on the top face 74 of the housing 70 and thus presses the temperature sensor 7 against the outer surface 60 of the measurement tube 6. In the present case, a screw is used as the pushing means. The screw is arranged in a threaded through opening in a central portion of the top plate 82 of the cover 8. The pressure exerted on the top 74 of the housing 70 can be adjusted by turning the screw in the threaded opening. In this regard, the pressure is expediently adjusted such that the temperature sensor is sufficiently pressed onto the tube 6 in order to ensure sufficient heat transfer to the contact surface 71. It is particularly preferred to adjust the pressure such that an essentially constant contact pressure is maintained over the whole temperature range to which the flowmeter will be subjected. That is, the contact pressure at the contact surface 71 will undergo only minimal changes, irrespective of whether the flowmeter is subjected to operating conditions in the low temperature range, on the one hand, or in the high temperature range, on the other hand. It is preferred that the contact pressure changes by at most 30%, even better at most 20% and most preferably less then 10%.

The finite elements method (FEM) can be used for estimating the optimal pressure which has to be exerted by the pushing means 84 for a specific temperature measurement system. The parameters primarily influencing the contact pressure are the stiffness of the central part 82 of the cover 8 and the torque of the screw—or the pressure of the pushing means in general, if a different pushing means is used. FEM simulation is conducted in a principally known manner on the basis of different stiffness values and different torques at different temperatures and an optimisation is carried out until minimum changes of the contact pressure in the chosen temperature range are obtained for the temperature measurement system of interest.

The foregoing description of the invention has been presented for the purpose of illustration. It is not intended to be exhaustive or to limit the invention to the precise form disclosed, and obviously, many modifications and variations are possible. Such variations and modifications that may be apparent to a person skilled in the art are intended to be included within the scope of the present invention as defined by the accompanying claims.

What is claimed is:

1. A temperature measurement system for measuring a temperature of a tube, comprising:
   a temperature sensor contained in a housing having a contact surface which is connected to an outer surface of the tube,
   wherein the contact surface has a concave form matching a form of the outer surface of the tube,
   wherein a temperature-conductive, flexible intermediate layer comprising graphite is arranged between the contact surface of the housing and the outer surface of the tube,
   wherein the housing is surrounded on at least one side thereof by a temperature-conductive cover which is connected in a temperature-conductive manner to the outer surface of the tube,
   wherein the cover has a form of a bridge straddling two opposing sides of the housing and a top of the housing,
   wherein the bridge is provided with a pushing means, the pushing means configured to press the housing against the outer surface of the tube with a pressure exerted on the top of the housing, and
   wherein the pushing means is configured such that the pressure exerted on the top of the housing is adjustable to change the pressure exerted on the housing, and a contact pressure between the housing and the outer surface of the tube is essentially constant in a given temperature range.

2. The temperature measurement system of claim 1, wherein the temperature sensor is a resistance temperature detector.

3. The temperature measurement system of claim 2, wherein the resistance temperature detector is selected from one of a PT100, PT500 and PT1000.

4. The temperature measurement system of claim 1, wherein the housing comprises a metal.

5. The temperature measurement system of claim 4, wherein the housing is a metal block.

6. The temperature measurement system of claim 4, wherein the metal is aluminum.

7. The temperature measurement system of claim 1, wherein the intermediate layer consists of graphite.

8. The temperature measurement system of claim 1, wherein the bridge is fastened at face sides thereof to the outer surface of the tube by at least one of brazing, soldering or welding.

9. The temperature measurement system of claim 8, wherein the face sides have rounded contact surfaces whose form is adapted to a form of the outer surface of the tube.

10. The temperature measurement system of claim 1, wherein the pushing means comprises a screw turnably arranged in a threaded opening in a central portion of the bridge.

11. The temperature measurement system of claim 1, wherein the cover comprises a metal.

12. The temperature measurement system of claim 11, wherein the metal is selected from steel or aluminum.

13. The temperature measurement system of claim 1, wherein the tube is a measurement tube of a flowmeter.

14. A flowmeter having a measurement tube, comprising the temperature measurement system of claim 13.

15. The flowmeter of claim 14 is a Coriolis mass flowmeter.

* * * * *